UNITED STATES PATENT OFFICE.

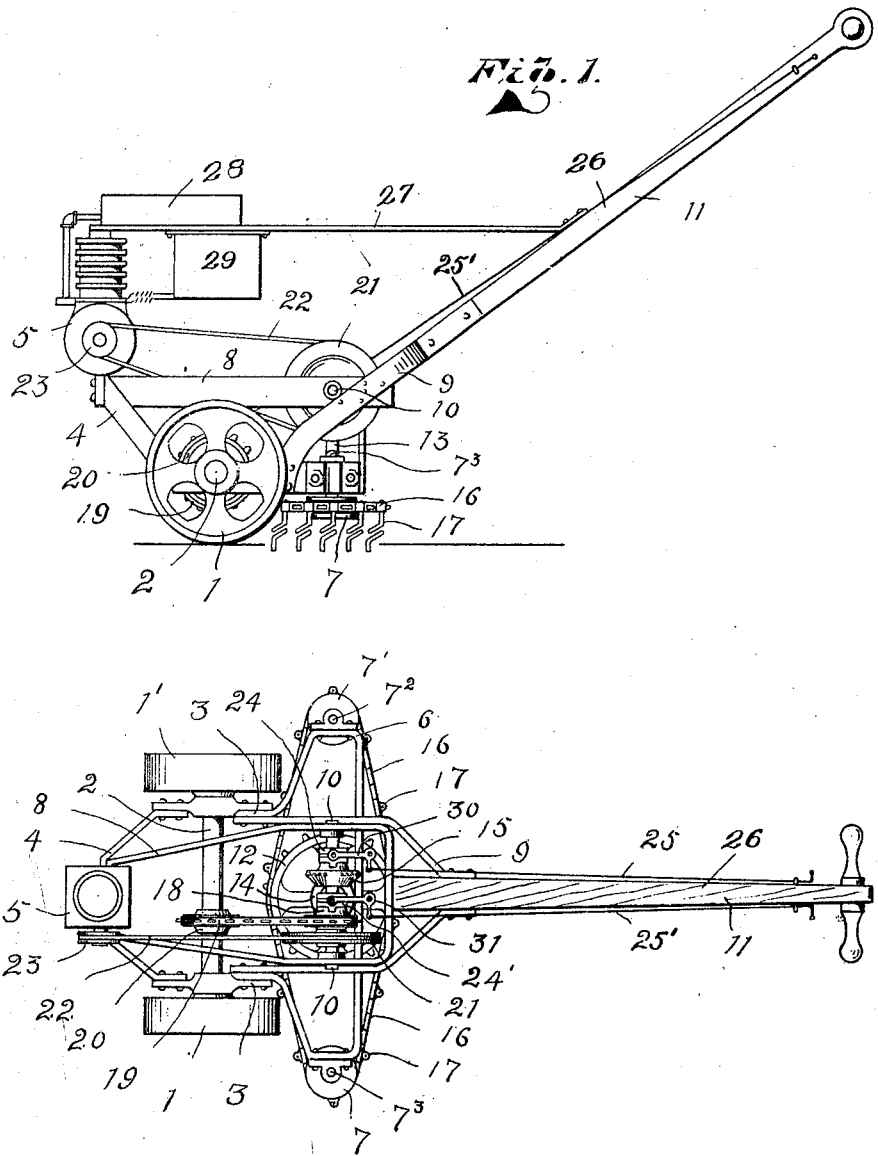

SYLVESTER GEORGE STEVENS, OF DULUTH, MINNESOTA, ASSIGNOR OF ONE-HALF TO ABRAM B. HOSTETTER, OF DULUTH, MINNESOTA.

MOTOR-DRIVEN HAND-CULTIVATOR.

1,038,454.  Specification of Letters Patent.  Patented Sept. 10, 1912.

Application filed January 20, 1912. Serial No. 672,513.

*To all whom it may concern:*

Be it known that I, SYLVESTER GEORGE STEVENS, a citizen of the United States, residing at Duluth, in the county of St. Louis and State of Minnesota, have invented certain new and useful Improvements in Motor-Driven Hand-Cultivators, of which the following is a specification, reference being had therein to the accompanying drawing.

My invention relates to improvements in motor driven hand cultivators.

The object of my invention is to provide a hand cultivator which is driven by a motor and the cultivating means driven by the same motor independent of the driving means, whereby the soil over which the cultivator passes may be cultivated to any desired extent by a single passage of cultivator over the soil.

Another object of my invention is to provide a motor driven hand cultivator having the cultivating teeth or elements extending laterally beyond the traction wheels in an improved manner whereby the soil may be cultivated as close to the row of growing plants as desired without the traction wheels injuring the plants.

Another object of my invention is to provide a cultivator of this character in which the cultivator and traction elements are independently operated and controlled and in which the operation of the former does not affect the operation of the latter in its draft upon the ground.

Heretofore all such machines as motor driven hand cultivators have been so constructed as to limit their cultivating action in relation to the propulsion of the vehicle, that is the cultivating elements have never been made to operate independent of the traction means or power of the cultivator. Some of the machines have been made to be propelled by the traction power of the revolving cultivator and are dependent thereupon for their traction powers. Others are propelled by traction wheels and draw their cultivating teeth or elements through the soil and still others are propelled by some outside force, such as hand or horse power and cultivating the soil through the medium of their traction elements, such as revolving disk or the like, or independent cultivating elements as the case may be. It is readily seen that the cultivating properties of such machines are limited to a single operation of the device, that is for a more thorough cultivation of the soil, the machine must be made to pass over the ground repeatedly, whereas in my cultivator in which the cultivating elements are operated independent of the traction power, the soil may be cultivated to any state of fineness with but a single passage of the cultivator thus dispensing with a great amount of labor in passing repeatedly over the same ground to destroy plant life and properly cultivate the ground.

In the accompanying drawing—Figure 1 is a side elevation of my improved cultivator. Fig. 2 is a top plan view with the oil tank and the battery box removed in order that the mechanism below may be more readily illustrated.

Referring now to the drawings 1 and 1' represent the two traction wheels of the cultivator which are fixed to the axle 2, and carried by said axle in the frame 3, which may be of any desired form, but preferably of that shown. The forward end of the frame extends upwardly at 4, which supports the motor 5 and has its rearward lower portion extending laterally beyond the wheels 1 and 1', as indicated at 6 and 6' and revolubly supporting the two side cultivator sprockets 7 and 7'. The said side cultivator sprockets are supported by vertical shafts 7² and 7³. The upper portion 8 of the frame of the cultivator is attached to a handle yoke 9 and supports the countershaft 10, and a handle 11 is rigidly supported by the yoke in any suitable manner. Connected to the handle 26 is a brace 27 which extends horizontally forward and which is secured to the upper end of the cylinder of the engine 5. Carried by said brace 27 is a tank 28 carrying the fuel for the engine. The said brace on its lower face carries a battery box 29 in which are arranged the batteries for the engine.

Supported in the frame 3, intermediate the sprockets 7 and 7' is a vertical shaft 13, which has at its lower end the sprocket 12, which is in a horizontal plane with the sprockets 7 and 7'. Passing around the sprockets 7 and 7' and engaging opposite sides of the large central sprocket 12 is an endless sprocket chain 16, which has attached thereto the cultivator teeth 17 which are designed to scratch the soil. The upper end of the shaft 13 is provided with a beveled gear 14, meshing with the beveled gear 15, which is loosely mounted upon the shaft 10. Loosely mounted upon the shaft 10 is a sprocket 18, around which a chain 19 passes, and said chain passing around a sprocket 20 carried by the axle. By this structure it will be seen that the axle 2 is driven forward for propelling the cultivator forward. The counter shaft 10 is provided with a pulley 21 rigidly secured thereto and over which passes a belt 22 driven by the pulley 23 carried by the engine shaft. By this structure it will be seen that the countershaft 10 is at all times revolving as long as the engine is running. The bevel gear 15 has in its outer face a clutch member into which the slidable clutch member 24 is adapted to interlock. The clutch member 24 is keyed upon the shaft 10 against rotation but longitudinally movable upon the shaft. A bell crank member 30 is pivoted to the frame 3 and has one end engaging the clutch member 24 and a lever or rod 25 secured to the opposite end, which extends along the side of the handle 11 in easy reach of the operator. Keyed upon the shaft 10 on the opposite side of the beveled gear 15 is a clutch member 24', which is longitudinally movable and adapted to interlock with the clutch member carried by the sprocket 18 and whereby the sprocket is coupled or uncoupled to the shaft for driving the axle 2 and causes the cultivator to move forward. Pivoted to the frame 3 is a bell-crank lever 31, which has one end engaging the clutch 24' and the opposite end secured to a lever or rod 25' which extends along the side of the handle 11 in easy reach of the operator.

By the structure herein described, it will be seen that by moving the clutch member 24' out of engagement with the sprocket 18, the forward motion of the cultivator is stopped but the cultivator chain continues to move to more thoroughly cultivate the ground in any desired spot, and it thus becomes possible to operate the cultivator vehicle back and forth by hand independent of the motor.

While I have shown and described the cultivator as being propelled and driven by a gas engine, it will be understood that an electric motor may be readily used.

Having thus described my invention, what I claim and desire to secure by Letters Patent is:

1. A cultivator, comprising a vehicle, a motor carried by the vehicle, cultivating elements carried by the vehicle, means carried by the vehicle for operating the latter either by the motor or by hand and means for operating the vehicle and cultivating element independent of each other.

2. A cultivator comprising a vehicle, a motor carried by the vehicle, means for manually controlling and operating the vehicle independent of the motor, soil cultivating elements supported by the vehicle and operated by the motor and means for operating the soil cultivating elements independent of the operation of the vehicle.

3. A cultivator comprising a vehicle, a motor carried by the vehicle, transverse horizontally operated cultivating elements carried by the vehicle movable thereon and continuously in cultivating position and operated by the motor.

4. A cultivator, comprising a vehicle, a motor carried by the vehicle, an endless belt upon vertical axis and operated horizontally and transversely the track of the vehicle, soil cultivating elements attached to the belt, whereby they engage the soil during their entire travel, and means whereby the cultivating element may be raised and lowered.

5. A cultivator, comprising a vehicle, a motor carried by the vehicle, cultivating elements carried by the vehicle and operated at a different speed to that of the wheels of the vehicle, and means carried by the vehicle for operating the latter by the motor or by hand.

6. A cultivator, comprising a vehicle, a motor carried by the vehicle, soil cultivating elements carried by the vehicle, and means carried by the vehicle for manually operating the latter independent of the motor.

In testimony whereof I hereunto affix my signature in the presence of two witnesses.

SYLVESTER GEORGE STEVENS.

Witnesses:
H. W. COFFIN,
A. B. HOSTETTER.